July 23, 1963 — R. SCHWERTER — 3,098,499

PRESSURE REGULATOR

Filed March 7, 1961

INVENTOR.
Robert Schwerter
BY Ralph Hanna
Attorney

United States Patent Office 3,098,499
Patented July 23, 1963

3,098,499
PRESSURE REGULATOR
Robert Schwerter, Anaheim, Calif., assignor to American Meter Company, Incorporated, Philadelphia, Pa., a corporation of Delaware
Filed Mar. 7, 1961, Ser. No. 93,998
4 Claims. (Cl. 137—463)

This invention is a gas pressure regulator in which a single valve regulates the gas pressure and shuts off the gas when dangerously low outlet pressure indicates a defect in the regulator or in the connected piping or appliances which should be repaired.

Figure 1:
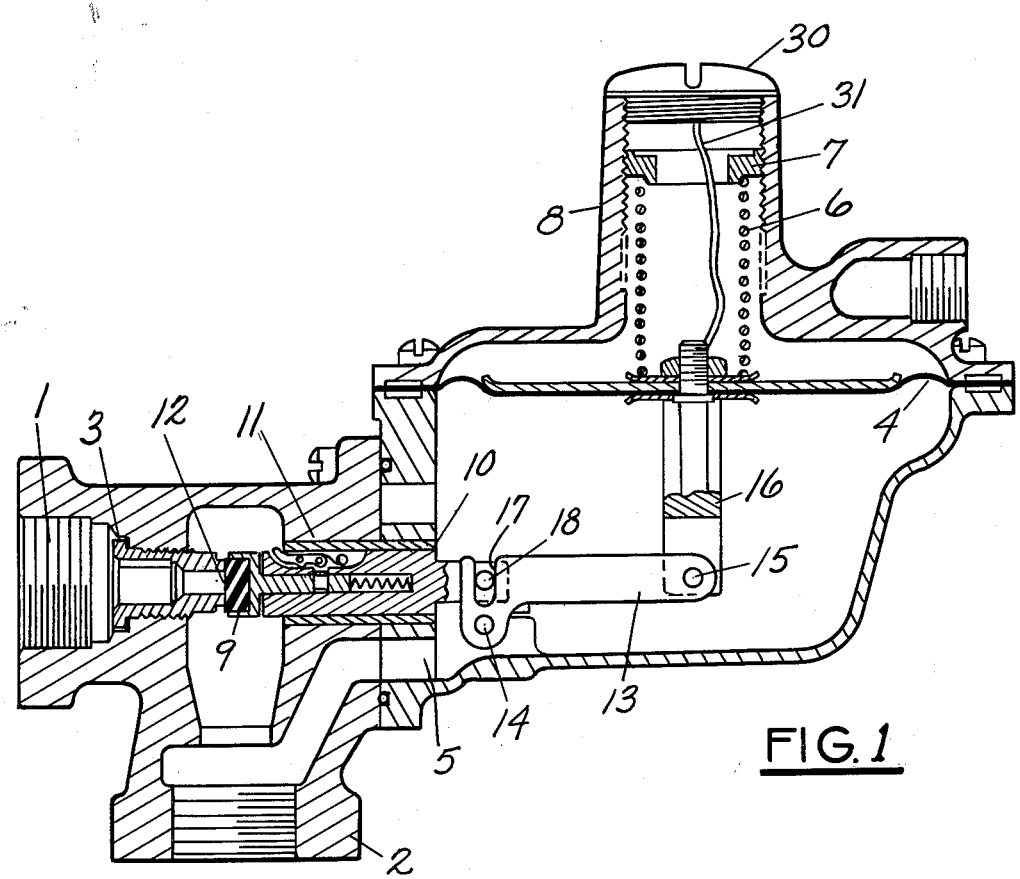
Figure 2:
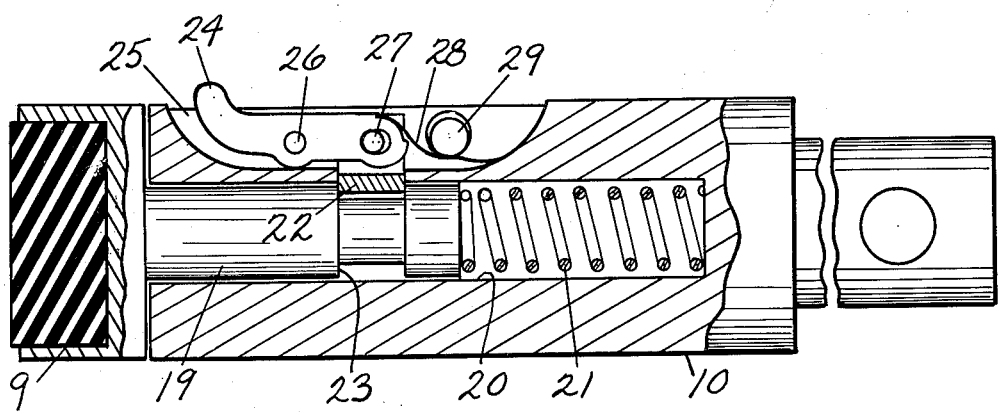

In the drawing, FIG. 1 is a section through a gas pressure regulator and FIG. 2 is an enlarged section through the valve member.

The conventional parts of the regulator are readily identified, 1 being the inlet, 2 the outlet, 3 the inlet orifice and 4 the diaphragm. The outlet pressure is applied to the under side of the diaphragm through a way 5. On the upper side of the diaphragm is a spring 6 exerting a downward force determined by the adjustment of a spring seat member 7 screwed into an upwardly extending tubular portion 8. The diaphragm moves up or down until the outlet pressure on the under side of the diaphragm reaches equilibrium with the spring pressure on the upper side of the diaphragm. The flow of gas through the orifice 3 is controlled by a valve member 9 at one end of a plunger 10 slidable in bushing 11. The valve member is shown seated against port 12 in the orifice 3 which is the no load condition under which no flow of gas is required to maintain the outlet pressure. The position of the valve member is controlled by a lever 13 mounted at one end on a fixed pivot 14 and connected at the other end by a pivot 15 to the lower end of a post 16 fixed to the center of the diaphragm 4. The lever 13 has a slotted section 17 receiving a pin 18 fixed to the plunger 10. As the outlet pressure falls, the diaphragm 4 moves downward, pulling the plunger 10 to the right and moving the valve member 9 away from the port 12. This admits the amount of gas required to maintain the outlet pressure. The parts so far described are or may be of common construction and may differ substantially in appearance from the construction illustrated.

While the gas regulator functions to maintain the outlet pressure under normal conditions, there are abnormal conditions under which the regulator cannot maintain the outlet pressure and under these abnormal conditions it is desirable that the gas be shut off so that the necessary correction or repairs can be made. For example, there may be a break in the piping, either upstream or downstream of the regulator. In such a case it would be dangerous for the regulator to attempt to maintain the gas pressure. The gas should be shut off and not turned on again until repairs have been made. Also, if the diaphragm 4 were badly ruptured, the position of the diaphragm would not correspond to the outlet pressure but would correspond to a lower pressure. Low pressure in the outlet can also arise when the demands of the connected load exceed the capacity of the regulator. Under all of these conditions, the equilibrium position of the diaphragm 4 corresponds to excessively low pressure and it is desirable that the gas be shut off until the necessary repairs have been made.

The shut off under low pressure conditions is effected by the same valve member 9 which controls the flow of gas to regulate the outlet pressure. The valve member 9 is mounted in telescoping relation to the plunger by a stem 19 slidable in the bore 20 of the plunger 10. A spring 21 urges the stem outward. Under normal conditions, a latch member 22 fits in a groove 23 in the stem 19 and prevents outward movement under the pressure of the spring. This is the position when the flow of gas is within the capacity of the regulator. Under abnormal conditions when the regulator moves the valve 9 to a wide open position in an attempt to satisfy an unreasonably high flow condition beyond the capacity of the regulator, the plunger 10 is moved to the extreme right in an effort to open the valve as wide as possible and a trip member 24 strikes bushing 11 and releases the latch 22. Trip member 24 is pivoted in a longitudinal groove 25 in the plunger and is connected to the latch 22 by a pin and slot connection 27. Under normal conditions, a torsion spring 28 mounted on pin 29 presses inward on the inner end of the trip member 24 and holds the latch 22 in the groove 23. When the outer end of the trip member strikes the bushing 11, it is pivoted about the pin 26 in a counterclockwise direction, lifting the latch 22 out of the groove 23, thereby disconnecting the valve member 9 from the plunger 10 and permitting the spring 21 to close the valve member 9 against the port 12, thus shutting off the flow of gas. There is no longer any connection between the regulator and the valve member 9 so that no gas can be drawn through the regulator until the condition which caused the abnormally low pressure has been corrected. When the correction has been made, the regulator is reset by unscrewing the cap 30 at the upper end of the tubular section 8 and pulling upward on pull member 31 which is attached to cap 30. This lifts the diaphragm 4 and causes the plunger 10 to be pushed to the left, thereby moving the latch 22 over the groove 23 in the stem 19. As soon as this position is reached, the latch member 22 is moved into the groove by the spring 28, thereby reconnecting the valve member 9 to the plunger 10 for normal regulating operation.

This construction permits the use of standard regulator design. The low pressure shut off feature does not in any way restrict the capacity of the regulator nor does it require changes in the design of the regulator itself.

What is claimed as new is:

1. In a gas pressure regulator having a housing with an inlet, an inlet orifice connected to the inlet and having a port discharging to the housing, an outlet, a chamber communicating with the outlet and closed by a diaphragm, and a tubular section housing a spring loading the side of the diaphragm remote from the outlet, a plunger mounted in the housing outside the inlet orifice for movement toward and away from said port, a linkage connecting the diaphragm and plunger for moving the plunger toward and away from said port in accordance with the outlet pressure, a valve member mounted on the plunger and movable from a retracted position in which the valve member is positioned to regulate the outlet pressure and an extended position in which the valve member closes said port, means urging the valve member to the extended position, a latch holding the valve member in the retracted position, means for tripping the latch when the plunger moves away from said port to a position corresponding to excessively low pressure, and a pull member in said tubular section for lifting the diaphragm against the force of the diaphragm loading spring to reset the latch.

2. In a gas pressure regulator having a housing with an inlet, an inlet orifice connected to the inlet and having a port discharging to the housing, an outlet, a chamber communicating with the outlet and closed by a diaphragm, and a tubular section housing a spring loading the side of the diaphragm remote from the outlet, a plunger mounted in the housing outside the inlet orifice for movement toward and away from said port, a linkage connecting the diaphragm and plunger for moving the plunger toward and away from said port in accordance with the outlet pressure, said plunger having a bore presented toward said port, a valve member having a stem in said bore and movable from a retracted position in which the valve member is positioned to regulate the outlet pressure and an extended position in which the valve member closes said port, a spring in the bore of the plunger engaging the stem and urging the valve member to the extended position, a latch member pivoted on the plunger and cooperating with the stem to hold the valve member in retracted positon, said latch member having a trip actuated by movement of the plunger away from said port to a position corresponding to excessively low pressure, and a pull member in said extension for lifting the diaphragm against the force of the diaphragm loading spring to reset the latch.

3. In a gas pressure regulator having a housing with an inlet, an inlet orifice connected to the inlet and having a port discharging to the housing, an outlet, a chamber communicating with the outlet and closed by a diaphragm, and a tubular section housing a spring loading the side of the diaphragm remote from the outlet, a valve member mounted in the housing outside said inlet orifice for movement toward and away from said port, a linkage connecting the diaphragm and valve member for moving the valve member to open and close said port in accordance with the outlet pressure, a latch connecting the valve member to the linkage, means for tripping the latch upon movement of the linkage to a position corresponding to low outlet pressure, means for moving the valve member to the closed position upon tripping of the latch, and a pull member in said tubular section for lifting the diaphragm against the force of the diaphragm loading spring to reset the latch.

4. In a gas pressure regulator having a housing with an inlet, an inlet orifice connected to the inlet and having a port discharging to the housing, an outlet, a chamber communicating with the outlet and closed by a diaphragm, and a tubular section housing a spring loading the side of the diaphragm remote from the outlet, a plunger mounted in the housing outside said orifice for movement toward and away from said port, a linkage connecting the diaphragm and plunger for moving the plunger toward and away from said port in accordance with the outlet pressure, a valve member in telescoping relation to the plunger and movable relative to the plunger from a retracted position in which the valve member is positioned to regulate the regulator outlet pressure and an extended positon in which the valve member closes said port, a latch for holding the valve member in the retracted position, a trip for the latch actuated by movement of the plunger away from said port to a position corresponding to excessive flow through the inlet.

References Cited in the file of this patent

UNITED STATES PATENTS

| | | |
|---|---|---|
| 1,433,416 | Reed | Oct. 24, 1922 |
| 2,581,071 | Born | Jan. 1, 1952 |
| 2,867,234 | Billington | Jan. 6, 1959 |

FOREIGN PATENTS

| | | |
|---|---|---|
| 1,133,926 | France | Nov. 26, 1956 |